Patented Aug. 15, 1944

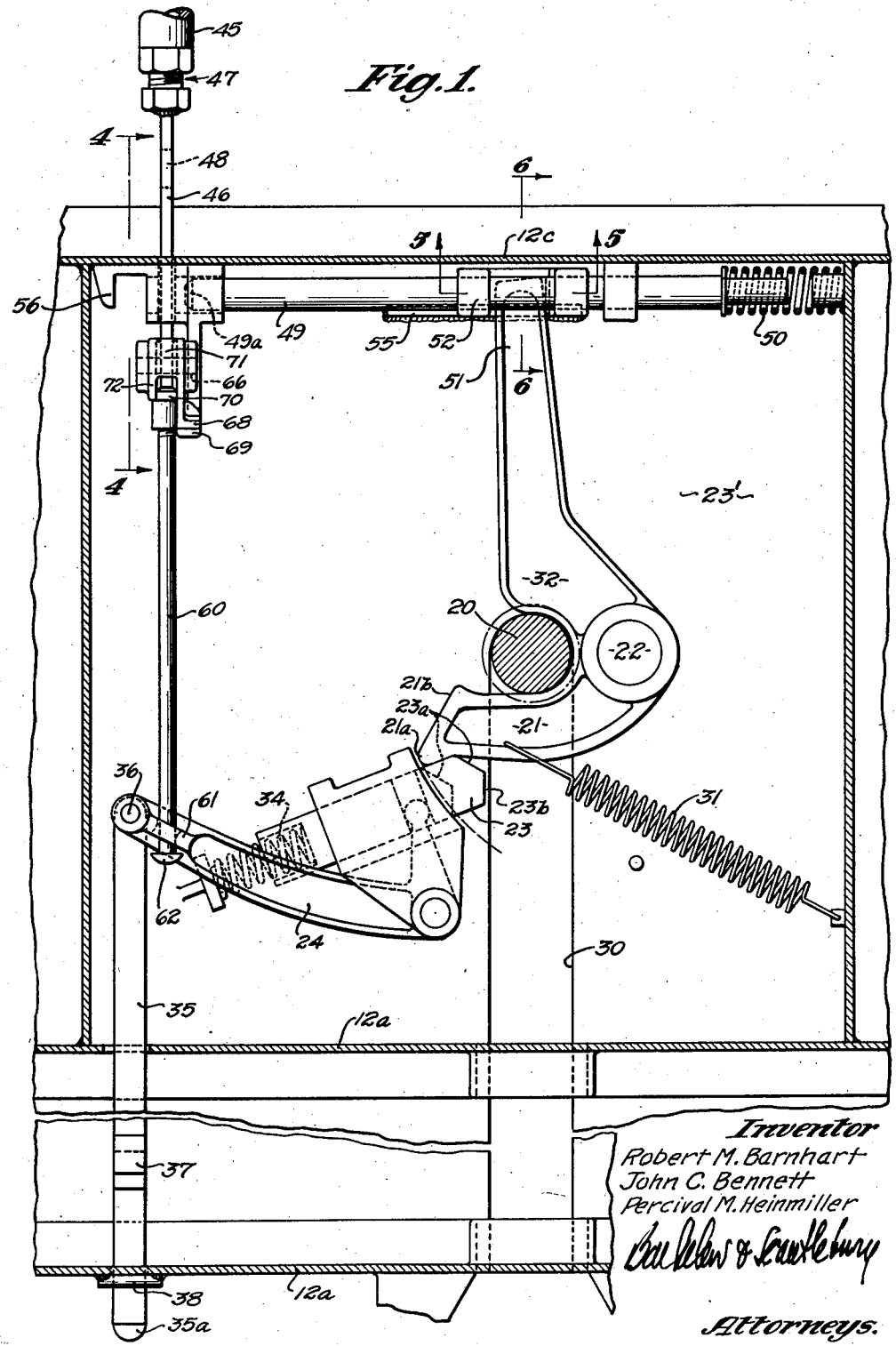

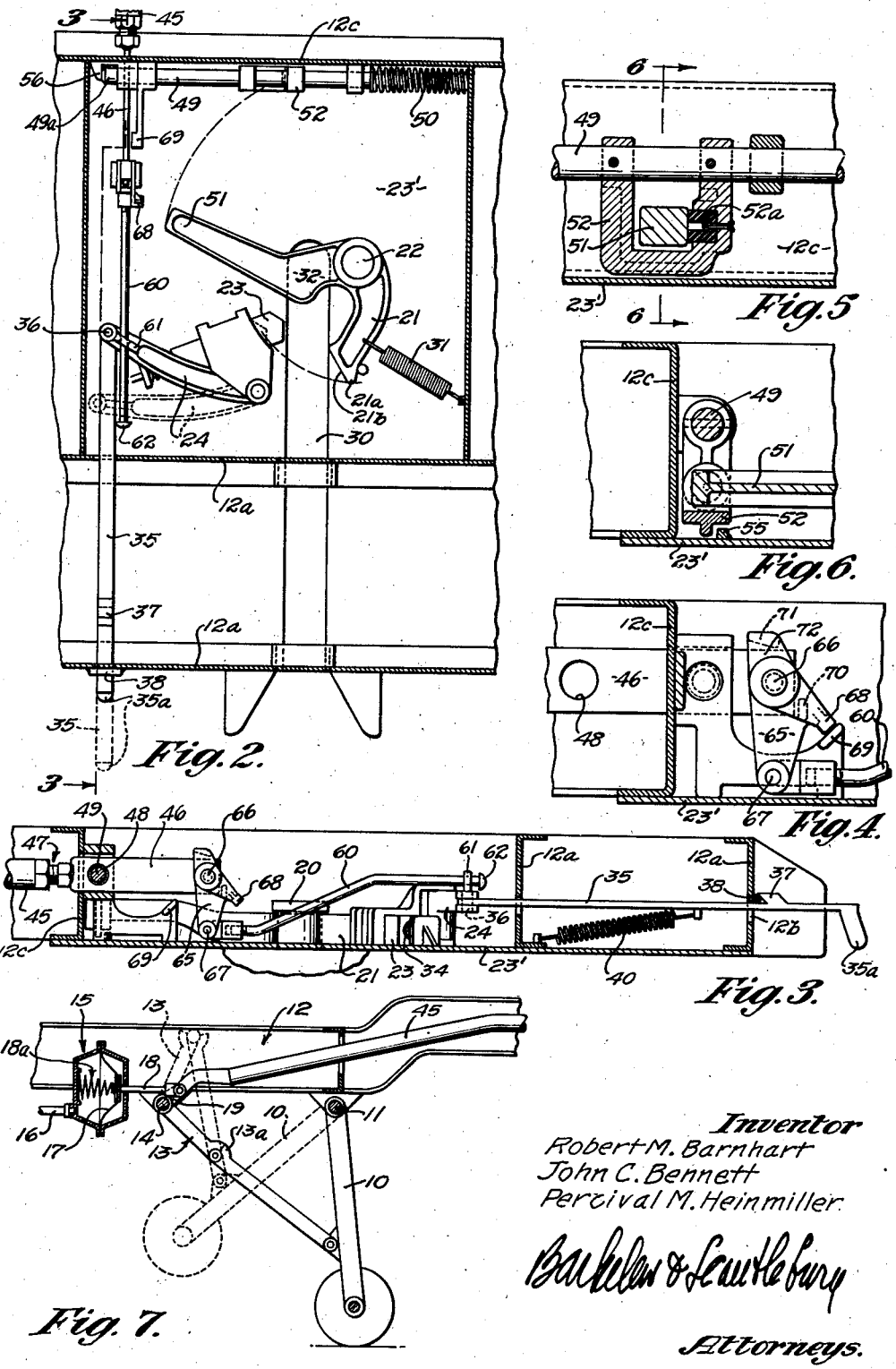

2,355,775

UNITED STATES PATENT OFFICE 2,355,775

INTERLOCK FOR COUPLINGS AND SUPPORTS OF TRAILERS

Robert M. Barnhart, San Gabriel, John C. Bennett, Pasadena, and Percival M. Heinmiller, Los Angeles, Calif., assignors to Utility Trailer Manufacturing Company, Los Angeles, Calif., a corporation of California Application November 6, 1942, Serial No. 464,776

25 Claims. (Cl. 280—33.1)

This invention has reference to mechanisms for cooperatively interlocking the operation of semi-trailer supports and coupling mechanisms. The general objective of the invention is the provision of an improved and simple form of interlocking or controling mechanism. The more particular objectives will be better understood, along with the corresponding accomplishments, from the following detailed description of a present preferred embodiment of the invention.

The interlock or controlling mechanism of the present invention is generally applicable to various types of couplers and various types of supports. The coupler and supports which are herein illustrated and described are to be taken merely as typical unless otherwise stated.

For the purpose of the following description of a typical and illustrative form of the invention, reference is had to the accompanying drawings in which:

Fig. 1 is a fragmentary sectional plan of the forward part of a trailer frame or body, showing a typical coupler and the improved controlling mechanism applied thereto, the coupler being shown in its closed position in which it receives and locks the coupler element or king pin of the tractor;

Fig. 2 is a similar view on reduced scale showing the position taken by the parts when the coupler is open;

Fig. 3 is a section taken as indicated by line 3—3 on Fig. 2, but showing the parts in a position which occurs in operation between the positions shown in Figs. 1 and 2;

Fig. 4 is a detail sectional elevation taken as indicated by line 4—4 on Fig. 1;

Fig. 5 is a detail elevational section taken as indicated by line 5—5 on Fig. 1;

Fig. 6 is a detail elevational section taken as indicated by lines 6—6 on Figs. 1 and 5; and Fig. 7 is a diagrammatic view showing a typical support for the trailer.

The general arrangement and cooperation of a tractor or towing vehicle, and a semi-trailer, are well known and need no description or illustration here. In combinations of one usual type to which the invention applies, the tractor and the trailer are provided with interengaging and interlocking coupler or draft lock elements which are engaged and locked together when the tractor backs under and lifts the forward end of the trailer. The interengaging coupler elements usually include a king-pin and a king-pin draft lock; the former commonly being mounted on the tractor and the latter on the trailer, but not necessarily so. That arrangement is used in the present typical illustration of the application of my invention.

The temporary support for the trailer usually and desirably embodies a support device mounted upon the forward part of the trailer and which may be raised and lowered with reference to the trailer by some suitable arrangement and some suitable means. The particular type or design of raisable support, and the means by which it is raised and lowered are, generally, of no consequence or import in the present invention. The arrangement shown in Fig. 7 is intended merely to be typical. In that figure the supporting leg or pair of legs are shown at 10, pivoted at their upper ends at 11 to trailer frame 12. A toggle linkage 13 is connected between legs 10 and an operating shaft 14 journaled on the trailer frame. The shaft may be oscillated by any suitable means to move the mechanism between the positions shown in full and dotted lines, a fluid pressure actuated means 15 being here shown, to be operated in this particular instance by vacuum. Vacuum is applied via pipe 16 to actuating diaphragm 17 which is connected by rod 18 to an arm 19 on shaft 14. When vacuum is applied, the parts are swung to the position shown in dotted lines, and continued application of vacuum holds the support in its upper position, which is the normal position during road travel of the coupled tractor and trailer. When it is desired to uncouple the tractor from the trailer and to leave the trailer supported independently, the supporting legs are lowered by cutting off the application of vacuum, when the legs drop under gravity to the full line position. Spring 18a may aid in that operation, and the legs are rigidly held in their lowered positions by the extended linkage and its knuckle 13a. Relief of vacuum to drop the legs is usually effected by breaking the vacuum line, which leads from the tractor to the trailer, preparatory to uncoupling.

The improved interlocking and controlling mechanism now to be described has as its general purpose to prevent uncoupling the tractor from the trailer until the trailer support has been lowered, and to prevent raising the support until the trailer is again coupled to the tractor. There are other purposes and accomplishments, as will appear.

As shown in Figs. 1 and 3, the numeral 20 designates the typical king-pin which is mounted upon the towing vehicle. The draft lock is here shown as mounted upon the trailer and is also here shown in a typical and illustrative form which embodies a coupler member or king-pin locking member 21 pivoted at 22 on a plate or other similar member 23' which forms a part of the trailer frame. Locking member 21 swings between the closed position shown in Fig. 1 and the open position shown in Fig. 2, and is latched and locked in its closed position by a spring pressed latch bolt 23. In the typical and illustrative form herein described, the draft lock includes both the coupler or locking member 21 and the latch 23, but either one or both such members may be used, as will appear, and other forms of draft lock may be used. The latch bolt is here shown as being operated by a latch lever 24 whose movement from the full line to the dotted line position in Fig. 2 withdraws latch bolt 23 to a position where its beveled nose is in the position shown in dotted lines in Figs. 1 and 2. In this partially withdrawn position of the latch bolt, the nose 21a of coupler member 21 will engage beveled face 23a of the latch as member 21 swings towards its open position impelled by the forward movement of king-pin 20. When king-pin 20 is then moved completely clear of the trailer, moving forwardly and out through slot 30 in plate 23', member 21 then remains in the position shown in Fig. 2 until the king-pin is reinserted. To prevent 21 from accidentally leaving its open position a spring 31 or other suitable means may be used.

When the king-pin is thus removed, latch bolt 23 immediately goes back to its position shown in full lines as shown in Figs. 1 and 2, ready to completely latch and lock coupler member 21 when that member is moved back to the closed position shown in Fig. 1. Upon reinsertion of the king pin, moving back through slot 30, it engages an extension 32 of member 21 to swing the latter back to its closed position. In this movement a beveled face 21b on the end of member 21 engages beveled nose face 23b of the latch bolt, to push the latch bolt back as member 21 swings past it. Latch spring 34 then springs the latch bolt in front of member 21 to lock it closed.

In the improved simplified form of the device in accordance with my invention, latch bolt 23 is moved to its dotted line position, or cocked position, by manual operation. As here shown, a bar 35 is pivotally connected at 36 to the outer end of latch lever 24 and extends forwardly to have an operating handle 35a on its forward end. As here illustrated bar 35 extends through openings in framing members 12a of the trailer. The bar has on its upper face a hooked lug 37 which is adapted to be hooked upwardly over frame member 12a at the upper edge of aperture 12b, or over a lug 38 which is provided on the frame member at the upper edge of that aperture. A spring 40 tends to pull bar 35 to the rear and thus to keep hook 37 in engagement with lug 38 until bar 35 is moved forwardly. When bar 35 is in the cocked position shown in Fig. 3, latch lever 24 and latch 23 are in the partially withdrawn positions shown in dotted lines in Fig. 2. In that position, when coupling member 21 is swung open the latch bolt 23 is pushed back a short distance as previously explained, and latch lever 24 is thrown forwardly a short distance ahead of the position shown in dotted lines in Fig. 2 and in full lines in Fig. 3. The consequent forward movement of bar 35 disengages hook 37 from lug 38 and bar 35 drops. Latch spring 34 then immediately throws the latch bolt and all of the described connected parts back to the position shown in the full lines in Figs. 1 and 2, with hook 37 disengaged, and with the latch bolt in position to latch and lock coupler member 21 when the king-pin is reinserted.

A connecting rod 45 is here shown typically, as connected at its rear end to the crank arm 19 on support operating shaft 14, so that the connecting rod moves forwardly to a definite forward position when the support moves to its lowered operative position, and moves rearwardly to a more or less definite position when the support is raised. It is not necessary to the operation of my device that the rearward position be definite to any great accuracy; it is desirable however that the forward position, with the trailer support down, be fairly definite.

A slide bar 46 is coupled to the forward end of connector rod 45 by a connection 47 which may be adjusted to adjust the relative longitudinal position of slide bar 46. Slide bar 46 has a locking aperture 48 which is adjusted to be in alinement with a slidable locking pin 49 when the trailer support is in its lowered operative position. Locking pin 49 has a spring 50 which tends to move it toward the left in Figs. 1 and 2 and tends to move the left end 49a of the locking pin through aperture 48 whenever the aperture comes into register. Locking pin 49 is however also controlled in its movements by the coupler member 21.

An arm 51 is formed as a rigid extension of pivoted coupler member 21 and extends rearwardly from pivot 22 when the coupler is closed as shown in Fig. 1. In this position the rear end of arm 51 lies between the arms of a stirrup 52 which is rigidly mounted on and depends from locking pin 49. The stirrup moves longitudinally with the locking pin and is kept in its substantially vertical position under the pin by being confined between frame member 12c and a guide bar 55 which is welded to frame plate 23. When coupler member 21 is locked closed, the extension arm 51 holds locking pin 49 back in the position of Fig. 1 against the pressure of spring 50. When the coupler is opened and arm 51 swings toward the position shown in Fig. 2, locking pin 49 will move toward the left in those figures and its end will enter and pass through aperture 48 in slide bar 46 if that aperture has been properly registered by lowering the support. If the aperture is not registered—if the support is not down—the locking pin cannot move and the coupler cannot open. After the left-hand end of pin 49 enters aperture 48, pin 49 and yoke 52 move on to the position shown in Fig. 2, in which position further movement of the locking pin is stopped by the end of the pin bringing up against a stop lug 56. In this position of the pin and yoke, the yoke has just reached or just slightly passed a position in which the end of arm 51 may swing clear of the yoke and then swing on to the full open position of the coupler shown in Fig. 2.

The parts which have been so far described remain in the positions shown in Fig. 2 as long as the coupler is open; and locking pin 49 in aperture 48 locks slide bar 46 in its forward position and consequently locks the trailer support down as long as the parts remain in that position, which they do until the coupler is subsequently closed by reinsertion of the king-pin. When the king-pin is subsequently reinserted and the coupler is thrown back to and locked in its closed position shown in Fig. 1, arm 51 reenters yoke 52 (striking on the inserted buffer 52a) and, during the latter part of the coupler closing operation, arm 51 moves yoke 52 and locking pin 49 back toward the right to the position shown in Fig. 1. In that position the forward end 49a of locking pin 49 has only a small clearance from slide bar 36, so that the locking pin does not leave engagement with slide bar 46 until coupler member 21 is closely approaching its final closed position. The arrangement is a simple one in the nature of a lost motion connection which positively connects the locking pin and the coupler for coordinated movement when the coupler is in or near its closed position. This positive connection acts in two manners; it positively holds the coupler closed when the locking pin is out of locking position, and necessitates the locking of the control bar and the support when the coupler moves open.

A brief consideration of the functions of the parts so far described is desirable, and particularly the functions of the coupler member and its arm 51 in cooperation with locking pin 49 and slide bar 46. In the positions of the parts shown in Fig. 1, and whenever the support is not in its lowered operative position, the coupler is prevented from opening and is effectively locked closed because locking pin 49 cannot move to the left more than a short clearance distance, and because the coupler member 21 is so connected with the locking pin that the coupler member cannot open unless the locking pin moves toward the left. Arm 51 and locking pin 49 may be regarded as a single unit or system which is so connected with the coupler member that the coupler member cannot open unless that unit or system can move into aperture 48 in slide bar 46. And slide bar 46 and its aperture may be viewed generally as a stop device which is placed effectively in front of lock pin 49 whenever the support is not in its lowered operative position, and is only removed from in front of lock pin 49 when the support is in its operative position.

The fact that arm 51 swings clear of connection with lock pin 49 during the latter part of the opening movement of the coupler is of no particular consequence, as that connection has no function to perform when the coupler is open and the support locked down. The arrangement is a simple and desirable one for operating locking pin 49 through the short stroke necessary for its functions, and for connecting pin 49 and arm 51 when that connection has a function to perform.

In addition to performing the function of locking the support down whenever the coupler is open, the mechanism also performs the function of locking the coupler closed whenever the support is raised out of its operative position. Whenever the support is removed but a short distance from its lowermost operative position, aperture 48 will not register with locking pin 49, and consequently the coupler cannot be opened. While, for reasons which will appear, the complete device includes the manually operable latch 23, the mechanism will operate as here stated without that latch. Without the latch the forward end of pin 49 would ride the face of slide bar 46, and the effective stop thus formed by the slide bar would at all times lock the coupler closed whenever the support is out of its lowermost position. In other words, after the king pin is reinserted to close the coupler and to remove lock pin 49 from aperture 48 it would then be the subsequent raising of the trailer support which would operate to lock the coupler closed.

Lock 23 performs the additional function of an additional lock for the coupler, locking the coupler closed as soon as the king pin is inserted. Then, when the support is raised by the operator (that being usually done by the mere operation of coupling up the fluid pressure lines between the tractor and trailer) the coupler is double-locked in such a manner that, although the operator releases latch 23 manually and independently of lowering the support, he still cannot open the coupler and free the king pin without lowering the support. The mechanism which is now about to be described has the effect of interconnecting the trailer support with the latch in such a manner that the latch cannot be opened until the trailer support is lowered.

A latch lever controlling rod 60 extends forwardly from slide bar 46 and through an apertured lug 61 on latch lever 24. A head 62 on the forward end of rod 60 lies close enough to the forward face of lug 61, with the parts in the position shown in Fig. 1, that latch lever 24 cannot be moved forwardly far enough to cock the latch bolt or to retract the latch bolt sufficiently to effectively unlock coupler member 21. In practice rod head 62 is positioned so as to allow only a slight forward movement of latch lever 24 when the parts are in the position shown in Fig. 1 and the trailer support is up in its fully raised position. There is however ample latitude for the raised position of the support, because rod head 62 can be considerably forward of the position shown in Fig. 1 and still prevent the latch from being retracted far enough to effectively unlock the coupling.

The latch controlling rod 60 may be directly connected with slide bar 46 and moved directly therewith. In that case, when the trailer support moves down and the slide bar 46 moves forward to the position of Fig. 2, controlling rod 60 moves forward the same distance and moves to the position shown in Fig. 2. In that position rod head 62 is far enough forward that latch lever 24 may then be moved forward to the latch cocking position shown in dotted lines in Fig. 2, and may then move further forward as the coupler opens. In that position of the parts the coupler will open when the king pin is moved forwardly, the latch bolt will be un-cocked as the king-pin moves out, and locking pin 49 will enter aperture 48 in slide bar 46 to lock the support down. Rod head 62 is, in effect, a movable stop which stands in the opening path of latch lever 24 until the support is down and is then moved out of that path.

It is preferred to connect control rod 60 with slide bar 46 through the medium of the mechanism shown in Figs. 3 and 4, so that certain additional functions may be performed. When a tractor and semi-trailer combination are left standing for any considerable period, coupled together, and with the trailer support up, the trailer support may move down or be moved down as a result of various circumstances, accidental or otherwise. If the support is manually operable there is always a possibility that someone may move the support down. And in fluid pressure actuated support systems the fluid pressure may leak away during an overnight stand. If the support is one of the common type which is raised by fluid pressure, positive or negative, and is lowered by spring pressure or merely allowed to drop when the fluid pressure is relieved, the dissipation of the fluid pressure may often allow the support to drop if the tractor-trailer combination is allowed to stand for any considerable period. The driver then may attempt to drive the combination away without allowing time enough for the fluid pressure to be built up again after he starts the engine, and the lowered support may be wrecked by striking an object or a hump in the road. The mechanism now about to be described prevents the accidental lowering of the support.

On the forward end of slide bar 46 a depending catch 65 is freely pivoted at 66 to hang normally in a vertical position, and the rear end of control rod 60 is connected to it at 67. The catch has a forwardly extending lug 68 which lies behind a fixed bracket 69 when slide bar 46 is in its rear position; and a stop lug 70 on the catch is engageable with the forward end of slide bar 46 to limit rearward swinging of the catch with relation to slide bar 46. Consequently slide bar 46 cannot move forward, and the trailer support cannot move down from its raised position until lug 68 is raised out of engagement with bracket 69, which is done by swinging catch 65 forwardly, and which in turn is done, as here shown, by pulling forward on control rod 60. Forward swinging of catch 65 is limited to about the amount necessary to clear lug 68 over bracket 69, by a stop lug 71 carried by an upper extension 72 of the catch. Stop lug 71 swings rearwardly and downwardly into engagement with the upper edge of slide bar 46 when lug 68 has been lifted high enough to clear bracket 69.

To lower the trailer support to its operative position and to effectively unlock the coupler, the operator must both relieve the fluid pressure from the support raising unit and pull the control bar 35 forwardly and hook it up in the position shown in Fig. 3. Or, if the support-raising pressure has dissipated for any reason, he must at least move control bar 35 to the position shown in Fig. 3. Normally the operator will first perform whatever operation is necessary to relieve the supporting pressure, when the support will then be in a condition to move down. Then the catch will hold the support up until the operator pulls forwardly on bar 35. As he moves bar 35 and latch lever 24 forwardly the latch lever will immediately pull control rod 60 forwardly and lift lug 68 over bracket 69. The trailer support is then free to drop immediately, or to be moved down more or less slowly depending upon the type of support and a means or force which moves it down. In the present illustrative instance it drops immediately. When the support drops to its lowermost position slide bar 46, link 65 and its connected parts and control rod 60 take the forward position shown in Fig. 3. In this position catch 65 will assume its substantially upright position, due to gravity, and rod head 62 will then be in a position forward of the lug 61 on latch lever 24, when the latch lever is in its forward cocked position shown in Fig. 3 and in dotted lines in Fig. 2. When slide bar 46 and control rod 60 have thus moved forwardly, the operator may move bar 35 and latch lever 24 forward and hook them up in the cocked position. In this position of the parts rod head 62 is either far enough forward, or the further forward movement which is allowed by the limited forward swinging of catch 65 puts head 62 far enough forward, to allow latch lever 24 the further forward movement which occurs when latch bolt 23 is pushed back by the opening coupler and the latch lever and latch bolt are uncocked. It may be remarked however that it is immaterial how much further forward of the position shown in Fig. 3 the rod head 62 may be when the other parts are in the position shown in that figure. In other words, the forward movement of slide bar 46 may be considerably greater than the forward movement of lever lug 61, although shown here to be about the same. While slide bar 46 should, in its forward position, be fairly accurately registered, so that locking pin 49 may enter aperture 48 with a fairly snug fit to lock the support dependably in a substantially fixed lowered position; the exact forward position of control rod head 62 is of no importance as long as that head moves forwardly far enough to allow latch lever 24 its full forward movement. It is only the rearward position of control rod head 62 which is important, and that rearward position may have a variation which has been previously noted.

If, due to the lost motion inherent in catch 65, the operator has hooked up bar 35 and thus cocked latch 23 before slide bar 46 reaches its foremost position and the support reaches its fully lowered position, the coupler still cannot open until slide bar 46 and the support have reached their ultimate positions. Until slide bar 46 reaches its full forward position, locking pin 49 cannot move to the left in Figs. 1 and 2 and the inter-engagement of arm 51 and stirrup 52 prevents the coupler from opening. And it may further now be remarked that, due to the facts just stated, the lost motion afforded by link 65 may be large enough to allow the operator to hook up the bar 35 and cock the latch before slide bar 46 has moved forwardly out of its rearmost position and before the support has started to lower. And in that case the operator may hook up the bar 35 before he manipulates the support mechanism to lower it or to put it into lowering condition.

The mechanism which has just been described has the secondary function of necessitating the cocking of the latch and unlocking of the coupler whenever the support is lowered. That function is performed because the latch-lever control rod 60 is used as the means of lifting the catch lug 68. The secondary function is convenient, as only one manipulation is required of the operator to release the support and unlock the coupler, and because the operator thus cannot do one of those things without the other. However, the primary function of catch 68 can be performed even though the catch is lifted independently of rod 60.

We claim:

1. In a tractor and semi-trailer combination in which the tractor and trailer are provided with interengaging draft elements including a draft lock element on one vehicle operable to lockingly engage the draft element of the other vehicle and movable between open and closed positions, and in which the trailer is provided with a support movable between supporting and non-supporting positions; interlocking mechanism acting between the movable support and the draft lock element to prevent opening of the draft lock element until the support has been placed in supporting position, and to prevent movement of the support from supporting position until the draft lock element has been closed, said interlocking mechanism comprising a control element carried by one vehicle and connected with the movable support to move therewith, a movable locking member controlled in movement by the control element and adapted to move into locking engagement with the control element when the latter is in its position corresponding to the supporting position of the trailer support, and motion transmitting connection between the locking member and the draft lock element whereby the locking member in non-locking position positively holds the draft lock element closed.

2. Interlocking mechanism as specified in claim 1, and in which the movable control element is in the form of an apertured slide bar, and the locking member is in the form of a sliding locking pin adapted to enter the aperture of the slide bar.

3. Interlocking mechanism as specified in claim 1, and in which the connection between the locking member and the movable draft lock element includes an arm connected with the draft lock element to move therewith in its closing and opening movements, said arm connecting directly to the locking member during its locking and unlocking movements.

4. Interlocking mechanism as specified in claim 1, and in which the motion transmitting connection between the locking member and the draft lock element transmits opening movement from the draft lock element to the locking member to move the latter to locking position.

5. Interlocking mechanism as specified in claim 1, and in which the movable control element is in the form of an apertured slide bar, the locking member is in the form of a sliding locking pin adapted to enter the aperture in the slide bar, and in which the connection between the locking member and the draft lock element includes an arm moving positively with the draft lock element in both its opening and closing movements, said arm connecting directly to the locking pin during its locking and unlocking movements.

6. Interlocking mechanism as specified in claim 1, and in which the movable control element is in the form of an apertured slide bar, the locking member is in the form of a sliding locking pin adapted to enter the aperture in the slide bar, and in which the connection between the locking member and the draft lock element includes an arm rigidly connected to the draft lock element to move therewith, and a lost motion connection between the arm and the locking pin which transmits motion therebetween during the movements of the draft lock element near its closed position.

7. In a tractor and semi-trailer combination in which the tractor and trailer are provided with interengaging draft elements including a swinging draft lock element on one vehicle operable to lockingly engage the draft element of the other vehicle and movable between open and closed positions, and in which the trailer is provided with a support movable between supporting and non-supporting positions; interlocking mechanism acting between the movable support and the draft lock element to prevent opening of the draft lock element until the support has been placed in supporting position, and to prevent movement of the support from supporting position until the draft lock element has been closed, said interlocking mechanism comprising an apertured controlling slide bar carried by one vehicle and connected with the movable support to slide back and forth as the support is moved between supporting and non-supporting positions, a locking pin slidable in a direction transverse of the slide bar and positioned to move into the slide bar aperture and lock the slide bar against movement when the support is in supporting position, a swinging arm formed as a rigid extension of the swinging draft lock element, and movement transmitting connection between the arm and the locking pin comprising a pair of spaced shoulders on the locking pin between which the end of the swinging arm engages when the draft lock element is in and near its closed position.

8. In a tractor and trailer combination in which the two vehicles are provided with interengaging draft elements including a releasable draft lock on one vehicle operable to lockingly engage the draft element of the other vehicle, the draft lock including a locking element which is movable through the last part of its opening movement by forcible removal of the second mentioned draft element from the draft lock, and in which the trailer is provided with a support movable between supporting and non-supporting positions; controlling mechanism acting between the movable support and the locking element to prevent opening movement of the latter when the support is in non-supporting position and to free the locking element for opening movement when the support is in supporting position, and manually settable means for moving and setting the locking element into partially open position, said manually settable means being releasable by virtue of movement of the locking element to fully open position.

9. Mechanism as specified in claim 8, and in which the manually settable means is independent of the lock element controlling mechanism.

10. Mechanism as specified in claim 8, and in which the lock element controlling mechanism is in the form of a stop which stands in the path of the opening movement of the lock element when the support is in non-supporting position, and is withdrawn from that path when the support is in supporting position.

11. Mechanism as specified in claim 8, and also including a manually releasable support lock acting to prevent movement of the support away from its non-supporting position.

12. Mechanism as specified in claim 8, and also including a manually releasable support lock acting to prevent movement of the support away from its non-supporting position, and means whereby movement of the manually settable means to set the locking element releases the support lock.

13. Mechanism as specified in claim 8, and in which the lock element controlling mechanism is in the form of a stop which stands in the path of the opening movement of the lock element when the support is in non-supporting position and moves in the direction of said opening movement when the support moves to supporting position, and connective means between said stop and the support including a catch which engages a stationary part of the vehicle to prevent movement of the support away from its non-supporting position, said catch releasable by movement of the stop in the direction of opening movement of the locking element.

14. In a tractor and trailer combination in which the two vehicles are provided with interengaging draft elements including a releasable draft lock on one vehicle operable to lockingly engage the draft element of the other vehicle, the draft lock including a locking element which is movable through the last part of its opening movement by forcible removal of the second mentioned draft element from the draft lock, and in which the trailer is provided with a support movable between supporting and non-supporting positions; an arm which moves in a longitudinal direction with the opening and closing movements of the locking element, a longitudinally moving slider connected with the support and moving in the direction of the lock opening movement of the arm when the support is moved to supporting position, a catch mounted on the slider and adapted to hold the slider in its position corresponding to the non-supporting position of the support and releasable by movement in the direction of the lock opening movement of the arm, a rod connected at one end with the catch and having a head at the other end lying in the path of movement of the arm, and manually settable means connected with the arm adapted to move the arm to set the locking element in partially open position.

15. Mechanism as specified in claim 1, and also including a manually releasable support lock acting to prevent movement of the support away from its non-supporting position.

16. Interlocking mechanism as specified in claim 1, and in which the motion transmitting connection between the locking member and the draft lock element transmits opening movement from the draft lock element to the locking member to move the latter to locking position, and also including a manually releasable support lock acting to prevent movement of the support away from its non-supporting position.

17. In a tractor and trailer combination in which the two vehicles are provided with interengaging draft elements including a releasable draft lock on one vehicle operable to lockingly engage the draft element of the other vehicle, the draft lock including a coupler movable between open and closed positions and a coupler latch which is movable through the last part of its opening movement by opening movement of the coupler, and the trailer being provided with a support movable between supporting and non-supporting positions; interlocking mechanism acting between the movable support and the draft lock to prevent opening of the draft lock until the support has been placed in supporting position, and to prevent movement of the support from supporting position until the draft lock has been closed, said interlocking mechanism comprising a control element carried by one vehicle and connected with the movable support to move therewith, a movable locking member controlled in movement by the control element and adapted to move into locking engagement with the control element when the latter is in its position corresponding to the supporting position of the trailer support, motion transmitting connection between the locking member and the draft lock coupler whereby the locking member in non-locking position positively holds the coupler closed and whereby opening movement of the coupler moves the locking member to its locking position, controlling means acting between the movable control element and the coupler latch to prevent opening movement of the latch when the trailer support is in non-supporting position and to free the latch for opening movement when the support is in supporting position, and manually settable means for moving and setting the latch into partially open position, said manually settable means being releasable by virtue of movement of the latch to fully open position.

18. Mechanism as specified in claim 17, and also including a manually releasable support lock acting to prevent movement of the support away from its non-supporting position.

19. Mechanism as specified in claim 17, and also including a manually releasable support lock acting to prevent movement of the support away from its non-supporting position, and means whereby movement of the manually settable means to set the latch releases the support lock.

20. In a tractor and semi-trailer combination in which the tractor and trailer are provided with interengaging draft elements including a draft lock element on one vehicle operable to lockingly engage the draft element of the other vehicle and movable between open and closed positions, and in which the trailer is provided with a support movable between supporting and non-supporting positions; interlocking mechanism whereby the support and the draft lock are mutually controlled each by the position of the other, comprising a control element connected with the support to move therewith, a movable locking member adapted to move into locking engagement with the control element when the support is in supporting position, and connection between the locking member and the draft lock element whereby movement of the locking member to locking position frees the draft lock element for opening and whereby closing of the draft lock moves the locking member out of locking position.

21. In a tractor and semi-trailer combination in which the tractor and trailer are provided with interengaging draft elements including a draft lock element on one vehicle operable to lockingly engage the draft element of the other vehicle and movable between open and closed positions, and in which the trailer is provided with a support movable between supporting and non-supporting positions; controlling mechanism whereby the position of the support controls the draft lock, comprising means whereby the support in supporting position frees the draft lock element for manual release, means for manually releasing the draft lock element, and means operating to hold the support in non-supporting position, said holding means being releasable by the manual draft lock release.

22. Mechanism as specified in claim 21, and in which the support holding means comprises a catch which automatically latches the support when the latter moves into non-supporting position.

23. In a tractor and semi-trailer combination in which the tractor and trailer are provided with interengaging draft elements including a draft lock element on one vehicle operable to lockingly engage the draft element of the other vehicle and movable between open and closed positions, and in which the trailer is provided with a support movable between supporting and non-supporting positions; controlling mechanism acting between the movable support and the draft lock element to prevent opening movement of the latter when the support is in non-supporting position and to free the lock element for opening movement when the support is in supporting position, said mechanism comprising a stop which stands in the path of the opening movement of the lock element, connective means between said stop and the support whereby the stop is moved in the direction of opening movement of the lock element when the support moves to supporting position, said connective means including a catch which engages a stationary part of the vehicle to prevent movement of the support away from its non-supporting position, said catch releasable by movement of the stop in the direction of opening movement of the draft lock element.

24. In a tractor and trailer combination in which the two vehicles are provided with interengaging draft elements including a releasable draft lock on one vehicle operable to lockingly engage the draft element of the other vehicle, the draft lock including a locking element which is movable through the last part of its opening movement by forcible removal of the second mentioned draft element from the draft lock, and in which the trailer is provided with a support movable between supporting and non-supporting positions; controlling mechanism acting between the movable support and the locking element to prevent opening movement of the latter when the support is in non-supporting position and to free the locking element for opening movement when the support is in supporting position, manually settable means for moving the locking element into partially open position, releasable means for holding the support in its non-supporting position, and means whereby movement of the manually settable means to partially open the draft lock releases the support holding means.

25. In a tractor and semi-trailer combination in which the tractor and trailer are provided with interengaging draft elements including a draft lock element on one vehicle operable to lockingly engage the draft element of the other vehicle and movable between open and closed positions, and in which the trailer is provided with a support movable between supporting and non-supporting positions; control mechanism whereby the opening of the draft lock element is controlled by the support, comprising a movable locking member adapted to move into locking relation to the support only when the latter is in supporting position, and motion transmitting connection between the locking member and the draft lock element whereby the locking member in its non-locking position positively holds the draft lock element closed and whereby movement of the locking member to locking position frees the draft lock element for opening.

ROBERT M. BARNHART.
JOHN C. BENNETT.
PERCIVAL M. HEINMILLER.